Nov. 21, 1933.      A. C. HARRELL       1,936,015
AUTOMATIC TRAIN PIPE COUPLING
Filed Oct. 7, 1932       2 Sheets-Sheet 1
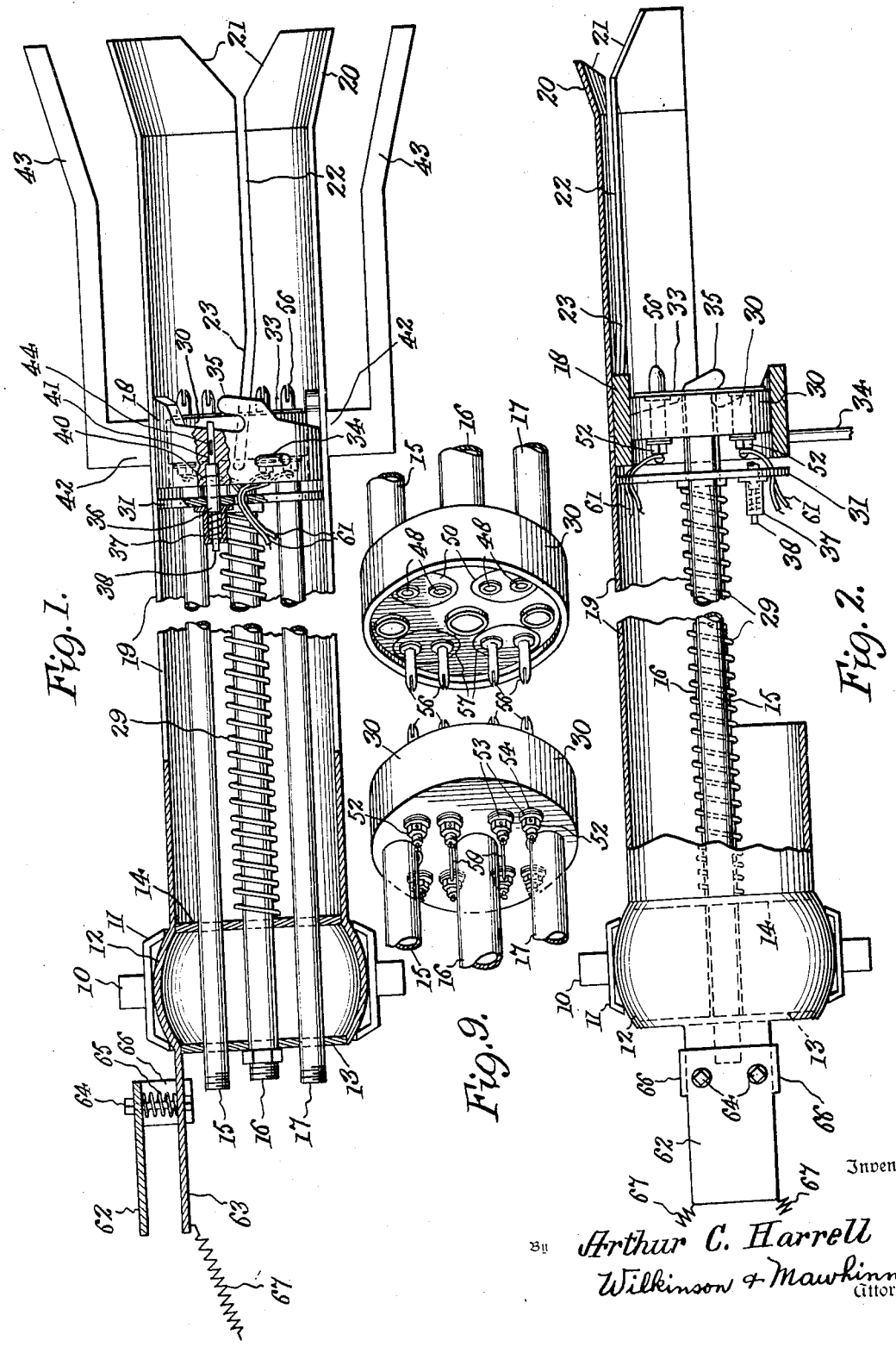
Inventor
Arthur C. Harrell
By Wilkinson & Mawhinney
Attorneys.

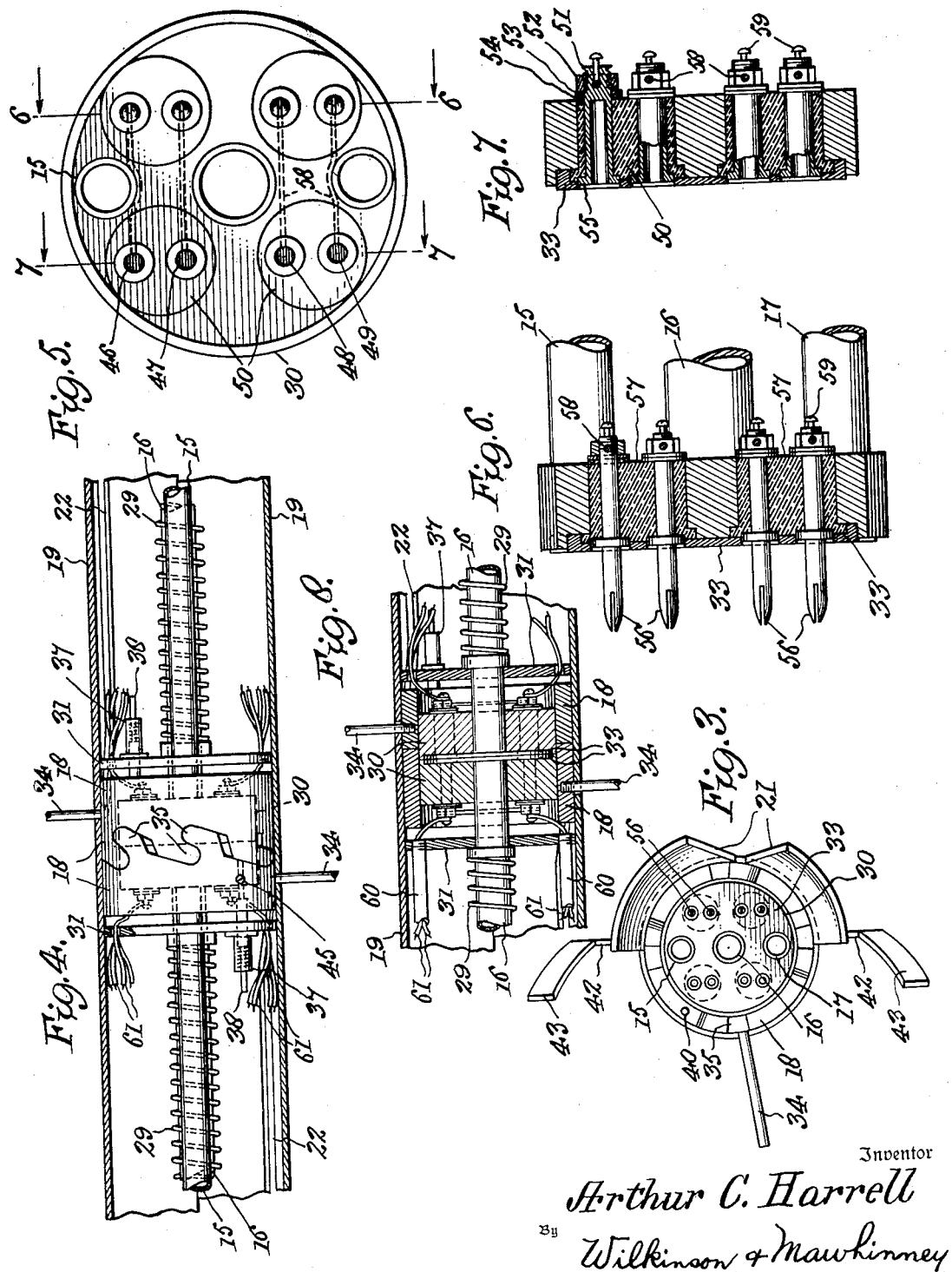

Patented Nov. 21, 1933

1,936,015

UNITED STATES PATENT OFFICE 1,936,015

AUTOMATIC TRAIN PIPE COUPLING

Arthur C. Harrell, Pensacola, Fla.

Application October 7, 1932. Serial No. 636,752

2 Claims. (Cl. 173—332)

The present invention relates to improvements in automatic train pipe couplings and constitutes certain improvements over the train pipe coupling shown and described in my prior Patent No. 1,886,398, granted November 8, 1932.

The objects of the present invention are in general the same as those in the prior application aforesaid, and in addition the present invention aims to provide a more rigid, more efficient and simple coupling in which not only the train pipes, but also electrical connections, may be effected through the medium of the coupling.

Further objects are to improve the construction generally, to provide for tight electrical, steam and water connections, to hold the structures up in a proper horizontal position and in alignment for proper and effective coupling, and to improve certain details of the construction.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a longitudinal section taken through one of the coupling members according to the present invention.

Figure 2 is a similar view taken at substantially right angles to Figure 1.

Figure 3 is an end view of the device.

Figure 4 is a fragmentary horizontal section showing two of the coupling members in the coupled position.

Figure 5 is an end view, taken on an enlarged scale, of one of the coupling blocks apart from the rest of the apparatus.

Figure 6 is a longitudinal section taken on the line 6—6 in Figure 5.

Figure 7 is a similar view taken on the line 7—7 also in Figure 5.

Figure 8 shows a fragmentary longitudinal section with the parts in coupled position, and Figure 9 is a fragmentary perspective view of the two mating coupling blocks.

Referring more particularly to the drawings, the car or a support carried thereby is indicated at 10 and in this support is mounted a universal housing 11 in which is movably mounted a universal ball joint 12.

Three train pipes 15, 16 and 17 are shown as passing slidably through the universal joint and into a sleeve 19 which carries at its outer end the cuff 20. The cuff is provided with a wide or flaring mouth 21 leading to a slot 22 having an inclined or offset portion 23.

The train pipes 15, 16 and 17 slide freely through a pair of fixed and spaced plates 13 and 14 which may be considered a part of the universal joint. The threaded ends of the train pipes projecting through the fixed plate 13 are readily attached by flexible hose sections to continued lengths of the train pipes which are attached to the bottom or lower portion of the car. These flexible hose connections are used to make the desired connections with this device to permit the proper operation of the same.

The sleeve 19 extends back to the universal joint member 12 and is adapted to move universally therewith. This universal joint member 12 and the sleeve 19 may be made in one piece or separately if desired.

A cylindrical guide block or bearing 31 is fixed in the sleeve 19 and is provided with as many openings as there are train pipes; the train pipes slidably fitting therethrough. The ends of the train pipes are secured in the coupling block or head 30. This coupling head consists of an external rotatable coupling ring 18 hollow within for slidably receiving therein the coupling head 30. Where the train pipe ends come out upon the coupling face of the coupling head 30, such coupling head is provided with a flush or countersunk gasket 33.

The gaskets of the two mating coupling heads are compressed to form a tight joint about the pipes.

The sleeves 19 and cuffs 20 are semi-cylindrical and the rotary ring portions 18 of the coupling heads carry pins 34 projecting out the open sides of the sleeves and entering the mouths 21 and the slots 22 of the opposed cuffs and sleeves, whereby to secure rotation of the coupling head rings 18, which rings carry the hooks 35 for interlocking together in the manner shown in Figure 4.

Plungers 36 are carried movably in sockets 37, which sockets are contained within casings secured to one face of the guide blocks or plates 31. The plungers have pins 38 thereon projecting through the rear walls of the socket casings 37. Coil springs surround the pins 38 and tend to urge the plungers 36 outwardly and into sockets 40 in the coupling rings 18 whereby normally to prevent the casual or accidental rotation of the rings 18 such as might shift the hooks 35 out of a proper alinement.

The rings 18 carry pins 41 axially of the plungers 36 and positioned to engage and strike the plungers 36 for moving the same out of the sockets 40. The outer ends of the pins 41 project sufficiently far to engage portions of the ring 18 of an opposite coupling head when the two coupling heads are brought together.

The pins 41 are limited in their movement by the elongated slots 44 in the same for engaging the inner ends of the set screws 45 carried by the rings 18. When the coupling heads come into initial contact, the length of the pins 41 is such that the division line between the pins 41 and plungers 36 will coincide with the inner face of the ring 18 so that the ring 18 may be rotated without interference from the locking plungers 36. Consequently, the rings may be rotated to interengage the hooks 35 and cause an interlocking of the coupling, as shown in Figure 4.

On the sleeves 19 are guide wings consisting of short connecting parts 42 extending in substantially right angles away from the outer portions of the sleeves 19 at diametrically opposite points. Extending forwardly from these pieces 42 are the arms 43, which arms have forward outwardly flaring or inclined portions which are curved or sloped also in a lateral direction, as indicated in Figure 3. When the two couplings of opposite cars come together, these arms or horns 43, which slope in opposite directions, come together and guide the parts together. They moreover prevent the sleeves and cuffs from spreading, as otherwise would be the case, particularly on a sharp curve.

The coupling heads accommodate electrical connections in an automatic way in order to provide for light and telephone connections. These connections are shown in Figures 5, 6 and 7. Each coupling head 30 is formed with a number of pairs of sockets, for instance the pairs of sockets 46, 47 and 48, 49. These sockets are preferably tapered slightly toward the back portions of the sockets and may be made of spring brass or other suitable material. The sockets will, of course, be insulated in the coupling heads, such insulation being provided by preferably circular insulating blocks 50 mounted as units with the pairs of sockets through the coupling head 30. The closed ends of the sockets or those ends which project toward the bearing plates 31 are extended beyond the heads 30, such extended portions being provided with threads 51 on which are engaged nuts 52. The nuts bind metallic washers 53 against insulating washers 54. At the outer free open ends of the sockets, the same are provided with out-turned flanges 55 for seating in grooves of the insulation blocks 50.

The other side of each coupling head, as shown in Figures 5 and 6, is provided with contact pins 56 which are adapted to engage corresponding sockets in an opposed coupling head. These pins 56 are also preferably mounted in pairs in insulating blocks 57 carried by the coupling head and may be mounted in such insulating blocks 57 in the manner already described for the sockets.

Wire connections 58 are made across from the sockets to the pins, as indicated in Figure 5, there being binding posts 59 on the rear portions of the sockets and pin, as shown in Figure 6. The wire connections, as shown in Figure 4, are carried back through the openings in the backing plates 31 and are within the protection of the sleeves 19. As many pairs of electrical connections in the coupling heads may be used as desired. These connections are for telephone, for electric lights and for any other electrical uses. At the end of the train there will be a dummy coupling head adapted to close off the pipe openings and to protect the electrical connections, and this dummy coupling head may be rotated by hand to interlock the same with the car coupling head. The pins 56 and sockets will also form dowel arrangements, and this is the reason why all of the sockets are not carried by one coupling head with all the pins carried by a mating coupling head, but it is preferred to have at each coupling head at least one pin and one socket.

In the use of the device, coil springs 29 will act to yieldably project the coupling heads and will permit same to move back upon engagement with one another. This engagement will serve to unlock the locking plungers 36 and the coupling rings 18 will thereupon be rotated to interlock the claws 35.

The springs 29 will be placed under tension in the interlocked position of the coupling heads so that a tight joint will always be made between the two abutting face plates or gaskets 33, which gaskets are preferably compressed by the action of locking the device.

In Figure 8 is shown small pipes 60 screwed into the plate 31 for housing the wiring 61 whereby to carry the wiring back through the sleeves in the same way in which the train pipes 15, 16 and 17 are carried.

As shown in Figures 1 and 2, plates 62 and 63 are provided adjacent the universal joint and are supported by the car. The inner plate 63 may be a part of the ball member 12 of the universal joint. The plates are spaced apart and connected at one end by bolts 64. Coil springs 65 are wound about the bolts between the plates for yieldably holding the same apart. The outer plate 62 is provided with flanges 66 which extend down and freely engage upon the side edges of the inner plate 63. The outer plate 62 will preferably be secured fixedly to a part of the car body. The inner plate 63 may have a vertical movement up and down on the bolts 64 and guided by the flanges 66 but the coil springs 65 will normally keep the movable plate 63 down, allowing the same to yield upwardly in accordance with rocking movement of the couplers.

This inner movable plate 63 is held as to its inner end by appropriate means such, for instance, as the coil springs 67, these coil springs being anchored to appropriate fixed parts of the car frame-work and preferably being arranged, as indicated in Figure 2, in divergent relation. This arrangement will tend to hold the coupler in an erect and proper horizontal position for avoiding any mismating of the coupler heads when two cars are brought together. The construction will also permit of a certain yieldability in the couplers. The construction also avoids unnecessary and damaging strains on the springs and bolts.

It will be obvious that various changes in the construction, combination and arrangement of parts could be made, which could be used without departing from the spirit of my invention, and I do not mean to limit the invention to such details except as particularly pointed out in the claims.

Having thus described my invention, what I claim and desire to secure by Letters Patent of the United States is:—

1. In an automatic pipe coupling for railway cars comprising a housing provided with a flat projecting end portion, a ball joint formed adjacent to and integral with the end portion, an outwardly extending sleeve from the ball joint, a fixed support for engaging the ball joint to form a universal joint, means for yieldably connecting the flat end portion to the car, a spring pressed plate mounted in spaced relation above the flat end portion whereby the spring pressed plate co-acts with the flat end portion to permit universal movement of the sleeve and to restore the same to initial position, pipes extending through the universal joint and sleeve, a coupling header carried by said pipes and having electrical connections therein, means for mechanically coupling mating headers, and spring means for tending to maintain said sleeves in a true horizontal position for efficient coupling.

2. In an automatic pipe coupling for railway cars comprising a housing having a ball joint adjacent one end and a sleeve integral therewith extending outwardly from the ball joint, means for supporting the ball joint to provide a universal joint, bearing plates fixed in the ball joint and the sleeve, pipes supported by the plates extending from the outside through the universal joint and sleeve, a circular header carried by the inner ends of the pipes, a plurality of insulating blocks supported by the header, electric pin and socket connections carried by the blocks, a locking ring mounted in the sleeve spaced from the interior bearing plate and to internally house the header, means for mechanically releasing and rotating mating rings when the same are allowed to contact and permit the mating headers with their respective pipes and electric contacts to abut, and spring means for tending to maintain said headers and sleeves in a true horizontal position for efficient coupling.

ARTHUR C. HARRELL.